United States Patent
Hadley

(10) Patent No.: US 10,656,041 B2
(45) Date of Patent: May 19, 2020

(54) DETECTION OF LEAKS FROM A PIPELINE USING A DISTRIBUTED TEMPERATURE SENSOR

(71) Applicant: SCHLUMBERGER TECHNOLOGY CORPORATION, Sugar Land, TX (US)

(72) Inventor: Maxwell Richard Hadley, Southampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 216 days.

(21) Appl. No.: 15/354,600

(22) Filed: Nov. 17, 2016

(65) Prior Publication Data

US 2017/0146423 A1 May 25, 2017

Related U.S. Application Data

(60) Provisional application No. 62/259,356, filed on Nov. 24, 2015.

(51) Int. Cl.
 *G01N 25/72* (2006.01)
 *G01M 3/00* (2006.01)

(52) U.S. Cl.
 CPC .................. *G01M 3/002* (2013.01)

(58) Field of Classification Search
 CPC ..................................... G01M 3/002
 See application file for complete search history.

(56) References Cited

U.S. PATENT DOCUMENTS

| | | | |
|---|---|---|---|
| 5,308,162 A * | 5/1994 | Amano | G01M 3/047 374/131 |
| 5,378,889 A * | 1/1995 | Lawrence | G01M 3/047 250/227.16 |
| 7,215,416 B2 | 5/2007 | Yamate et al. | |
| 7,251,038 B2 | 7/2007 | Mcinnes et al. | |
| 7,292,345 B2 | 11/2007 | Hadley et al. | |
| 7,412,117 B2 | 8/2008 | Chen et al. | |
| 7,730,936 B2 | 6/2010 | Hernandez-Solis et al. | |
| 8,177,424 B2 | 5/2012 | Hampson et al. | |

(Continued)

FOREIGN PATENT DOCUMENTS

WO WO2015153549 A1 10/2015

OTHER PUBLICATIONS

Yang et al. (NPL "A Two Fiber Bragg Grating Gas Leakage Detection Sensor". 2012 Photonics Global Conference (PGC), Dec. 13-16, 2012.*

(Continued)

*Primary Examiner* — Lisa M Caputo
*Assistant Examiner* — Nasir U. Ahmed

(57) ABSTRACT

A distributed temperature sensing (DTS) system is operated to detect fluid leaks from a pipeline. The DTS system obtains temperature profiles from a sensing element that is deployed along the pipeline, where the profiles are temperature measurements as a function of distance. The temperature profiles are examined to identify the presence of a characteristic temperature signature expected to occur in the presence of a leak. A leak condition signal for a particular distance point is generated based on a determination that the energy of the temperature signal exceeds a threshold energy for that point.

19 Claims, 5 Drawing Sheets

(56) References Cited

U.S. PATENT DOCUMENTS

| | | |
|---|---|---|
| 8,401,401 B2 | 3/2013 | Hartog et al. |
| 8,788,251 B2 | 7/2014 | Weng et al. |
| 8,910,714 B2 | 12/2014 | Tardy et al. |
| 2005/0140966 A1 | 6/2005 | Yamate et al. |
| 2006/0010973 A1 | 1/2006 | Brown |
| 2006/0115204 A1 | 6/2006 | Marsh et al. |
| 2009/0326826 A1* | 12/2009 | Hull .................... E21B 47/1005 702/8 |
| 2012/0248078 A1* | 10/2012 | Zediker ..................... E21B 7/14 219/121.67 |
| 2014/0290343 A1* | 10/2014 | Kulkarni ............... G01M 3/002 73/40.5 R |

OTHER PUBLICATIONS

Mackay, D. J. C., "An Example Inference Task: Clustering" Chapter 20 in Information Theory, Inference and earning Algorithms, Cambridge University Press, 2003, 13 pages.

\* cited by examiner

DETECTION OF LEAKS FROM A PIPELINE USING A DISTRIBUTED TEMPERATURE SENSOR

This application claims the benefit of U.S. Provisional Application Ser. No. 62/259,356, filed on Nov. 24, 2015, which is incorporated by reference herein in its entirety.

BACKGROUND

Hydrocarbon fluids such as oil and natural gas are obtained from a subterranean geologic formation, referred to as a reservoir, by drilling a well that penetrates the hydrocarbon-bearing formation. The hydrocarbon fluids produced from the well can be transported to other locations via a pipeline that is buried in the ground and which extends over a very long distance. These pipelines can develop leaks, which can go undetected without an appropriate system in place to monitor the condition of the pipeline.

One manner in which information can be obtained about the condition of a pipeline is to use a distributed fiber optic sensing system, such as a distributed temperature sensing (DTS) system. Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. In general, measurements are made using fiber optic sensors by detecting returned light that is scattered by naturally-occurring reflective features in the fiber in response to a probe signal, and can be based on spontaneous Raman scattering, stimulated Brillouin scattering, or Rayleigh scattering. When a distributed fiber optic sensor is used with an appropriate measuring system to interrogate and acquire information from the sensor, selected environmental parameters (e.g., temperature) can be monitored at multiple locations at the same time.

SUMMARY

Embodiments of the present disclosure operate to detect a pipeline leak using the temperature of a sensing element alongside the pipeline, the sensing element being part of a distributed temperature sensing ("DTS") system. The DTS is operated to obtain temperature profiles from the sensing element, where a temperature profile is a measure of temperature at sample distance points along the sensing element. The temperature profiles are spatially filtered in order to identify temperature signatures that are indicative of a fluid leak. Energy profiles for the filtered temperature profiles are then determined, which are then evaluated to determine whether the energy profile at sample distance points exceeds an energy threshold. Leak condition signals are generated based on the energy threshold determinations. An alarm signal can be generated if any of the leak condition signals is indicative of a fluid leak.

Embodiments described herein also disclose a system for identifying leaks in a pipeline. The system includes a sensing element deployed along the pipeline and a DTS system that is configured to obtain temperature profiles from the sensing elements. An alarm processing system has one or more processing channels for processing the temperature profiles. A processing channel includes a channel filter to filter the profiles for a particular temperature signature, an energy profile generator to determine energy at distance points of the filtered temperature profiles, and a leak condition detector to examine the energy profiles and to output a leak condition signal indicative of whether energy at a distance point exceeds a threshold value.

Embodiments of the present disclosure further disclose operating a DTS system to obtain a time sequence of temperature profiles from a sensing element that is deployed proximate a pipeline that transports a fluid. The temperature profiles are spatially filtered to identify temperature signatures that are indicative of one or more leak conditions at distance points along the sensing element. For each of a plurality of distance points, a determination is made whether an energy component of the temperature signature exceeds a threshold energy for that distance point. Based on the determination, an alarm signal is generated that identifies a fluid leak at one or more of the distance points.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

DETAILED DESCRIPTION

Figure 1:
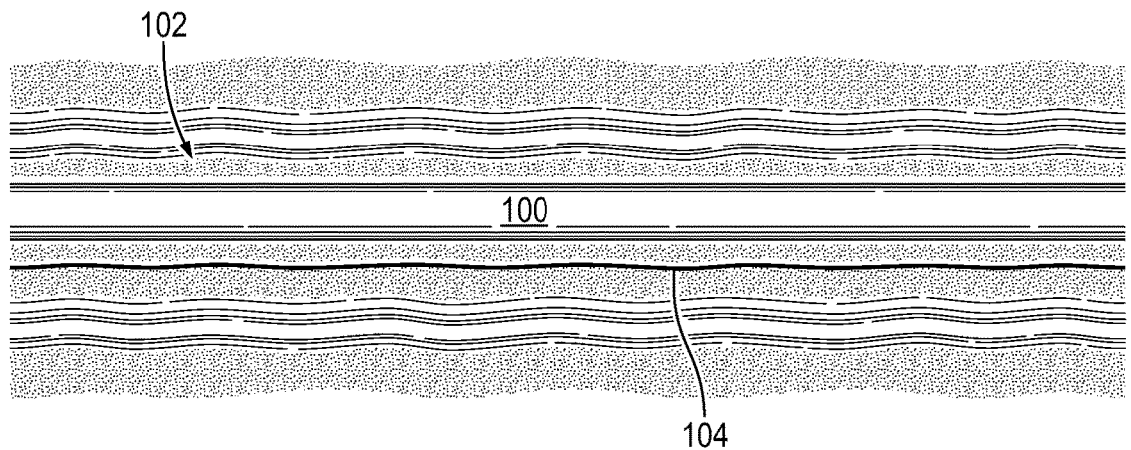
FIG. 1 is a plan view of an exemplary installation of a pipeline buried in a trench that also contains an optical fiber cable that forms the sensing element of a distributed temperature sensing system, according to an embodiment.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Lengthy pipelines often are used to transport hydrocarbon fluids that have been produced from a well. Where these pipelines are buried in the ground, fluid leaks from the pipeline can go undetected unless an appropriate monitoring system is in place. Because fluid leaks will generate thermal effects in the vicinity of the pipeline, one type of monitoring system that can be used to detect leaks is a distributed temperature sensing (DTS) system that monitors temperatures along the length of the pipeline. In general, the thermal effects of a buried pipeline under no-leak conditions are determined by the temperature of the pipeline contents, the environmental temperatures on the surface and underground at a large distance from the pipeline, and the thermal conduction properties of the pipeline, any thermal insulation surrounding it, and the ground material. In the event of a leak, additional effects arise including advection (transport of heat by moving material), change of thermal conductivity as the pipeline fluid displaces any pre-existing gases or liquids in the ground, and the Joule-Thomson effect caused by expansion of the pipeline fluid as it moves from the high pressure environment within the pipeline to the lower pressure outside. These effects interact in complex ways, and can cause the temperature at different points near the pipeline to either rise or fall under leak conditions.

The three-dimensional temperature distribution around a buried pipeline under leak and no-leak conditions can be estimated using combined Computational Fluid Dynamics (CFD) and heat flow numerical simulation. The simulation can be repeated making different choices of the various parameters involved, including but not limited to the diameter of the pipe, the depth of burial, the temperature, pressure, and physical properties of the pipeline contents, the thermal properties, permeability, and other physical properties of the surrounding ground material, and the size and exact location of the leak itself.

The temperature signature can be obtained by sampling the simulated three-dimensional temperature distribution along the line of the DTS sensing element's location (relative to the pipeline). By varying the appropriate parameters in the simulation, a set of representative temperature signatures can be calculated, covering the range of anticipated operating and environmental conditions appropriate to a specific pipeline to be monitored. Each signature is the distribution of temperature over distance along the DTS sensing element expected under the given leak conditions.

The technique of matched filtering can be used to detect the presence of a signal of known characteristics in the presence of noise, and this filtering can be extended in the distance domain (rather than the time domain). However, the simulations show that the characteristic signatures arising from different leaks, even if the pipeline configuration remains constant, can vary widely, making the matched filter technique inapplicable.

Accordingly, embodiments disclosed employ a different method of filtering and processing the filtered data to allow detection of a much wider range of signatures, thereby implementing a more robust method of thermal leak detection.

Turning now to the example embodiment shown in FIG. 1, a plan view of a pipeline 100 buried underground in a trench 102 is shown. In general, the pipeline 100 will be buried at a depth of about 2 meters. During installation, as the trench 102 is backfilled, a DTS sensing element 104 (e.g., an optical fiber cable) is deployed alongside the pipe 100, such as above the pipe 100 and to one side of it in the trench 102, and then covered with additional backfill material. The optical fiber cable 104 is generally parallel to the pipeline 100, but its position and burial depth can vary slightly along the length of the pipeline trench 102.

Figure 2:
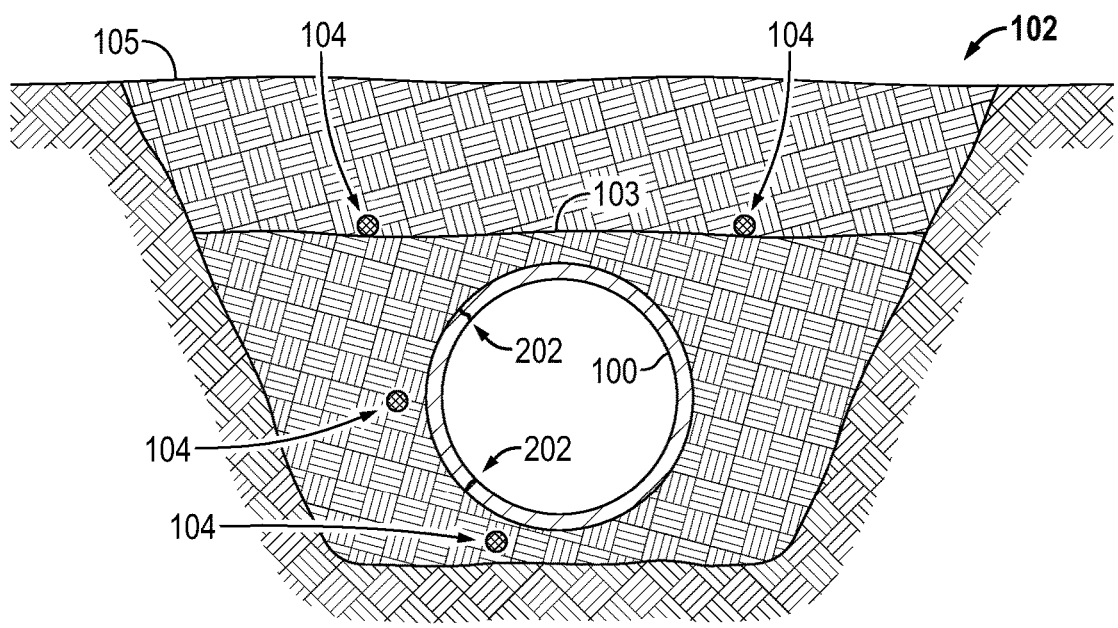
FIG. 2 is a cross-sectional view of the buried pipeline of FIG. 1, showing alternate representative locations for the optical fiber cable, as well as example locations of a pipeline leak, according to an embodiment.

The location of the sensing element 104 in FIG. 1 is shown as an example, and it should be understood that other choices of cable location in the trench 102 can be used, provided the sensing element 104 is suitably located with respect to the pipeline 100 so that measurement of a temperature profile and detection of a temperature signature indicative of a leak condition along the length of the pipeline 100 is possible. Examples of other locations of sensing element 104 relative to the pipeline 100 in the trench 102 are shown in the cross-sectional view of FIG. 2. As shown, the pipe 100 is positioned in the trench 102, which then is backfilled to an intermediate level 103. In embodiments, one or more sensing elements 104 are then laid, and the trench is further backfilled up to the surface level 105. In other embodiments, one or more sensing elements 104 can be laid at the same depth as the pipe 100, or below it. Regardless of the depth, a sensing element 104 is suitably located to detect the leaks 202 shown at example leak locations. It should be understood that only one sensing element 104 can be deployed in the trench 102, or more than one sensing element 104 can be deployed, such as two or more of the sensing elements 104 shown in FIG. 2.

Figure 3:
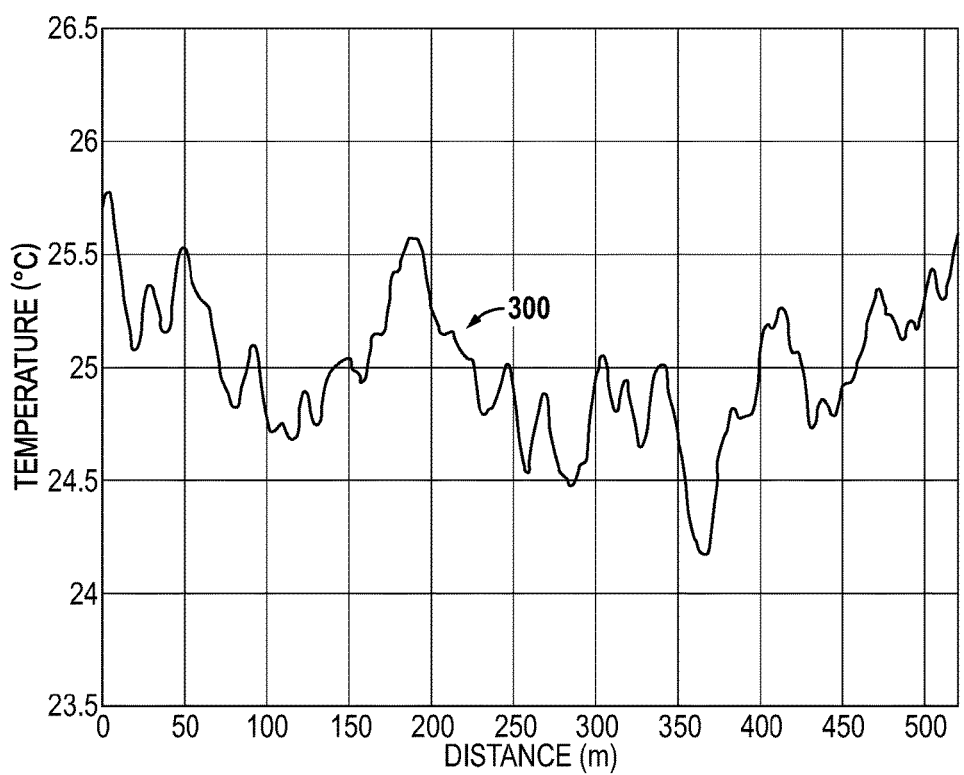
FIG. 3 is a plot of temperature versus distance along the sensing element of FIG. 1 in the absence of a leak, showing an example random fixed-pattern background variation in temperature along the sensing element, according to an embodiment.

Regardless of the particular location or number of the sensing elements 104, in the absence of a pipeline leak, in steady-state conditions, the measured temperature along the sensing element 104 will vary in an apparently random manner about its mean value. This variation remains stable over long periods of time and is hereafter referred to as a random fixed-pattern background. An example of a random fixed-pattern background temperature variation 300 is shown in FIG. 3, where the vertical axis represents temperature (measured in ° C.) and the horizontal axis represents distance from the measuring instrument (measured in meters). The fixed-pattern background 300 arises from variations in the burial depth of the sensing element 104, variations in the thermal properties of the ground and backfill materials, and potentially also from variations in the optical properties of the sensing element 104 (e.g., such as in embodiments where the DTS is an optical DTS using Brillouin scattering sensing). The frequency spectrum of the fixed-pattern background temperature variation 300 with distance is characteristic of the particular installation.

Figure 4:
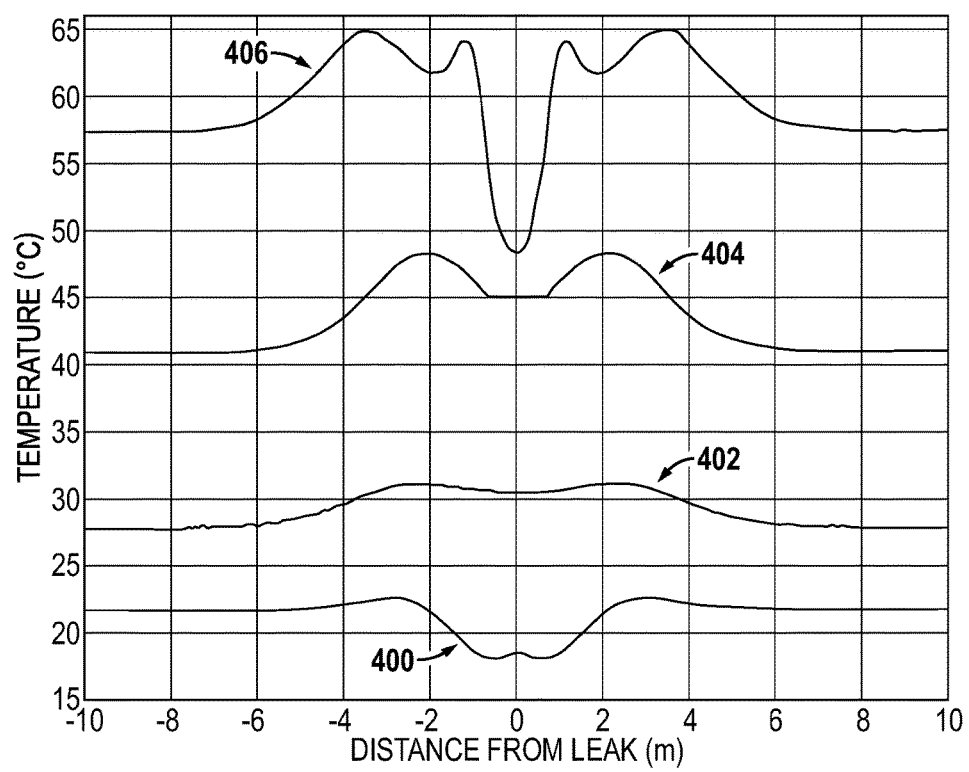
FIG. 4 is a plot of temperature versus distance along the sensing element from the position of the leak, showing a number of example thermal signatures for different leak conditions and locations.

Turning now to FIG. 4, a plot of temperature (measured in ° C.) versus distance (measured in meters) from the position of a leak is illustrated, showing multiple simulated thermal signatures 400, 402, 404, 406 that are expected to be observed in the presence of different leak conditions and locations. As can be seen in FIG. 4, the simulated thermal signatures 400-406 have characteristics which differ from the random fixed-pattern background 300. FIG. 4 also shows that, although different leak conditions generate different signatures, they have some common characteristics. The signatures are localized to within a short distance of the location of the leak, and although the temperature effect may be an increase or a decrease, or both, most of the temperature variation occurs over a short distance range (in the examples, approximately 4 meters on either side of the leak) relative to the overall length of the pipeline. These common characteristics are also reflected in the frequency spectrums of the temperature variation with distance of each signature 400-406.

Figure 5:
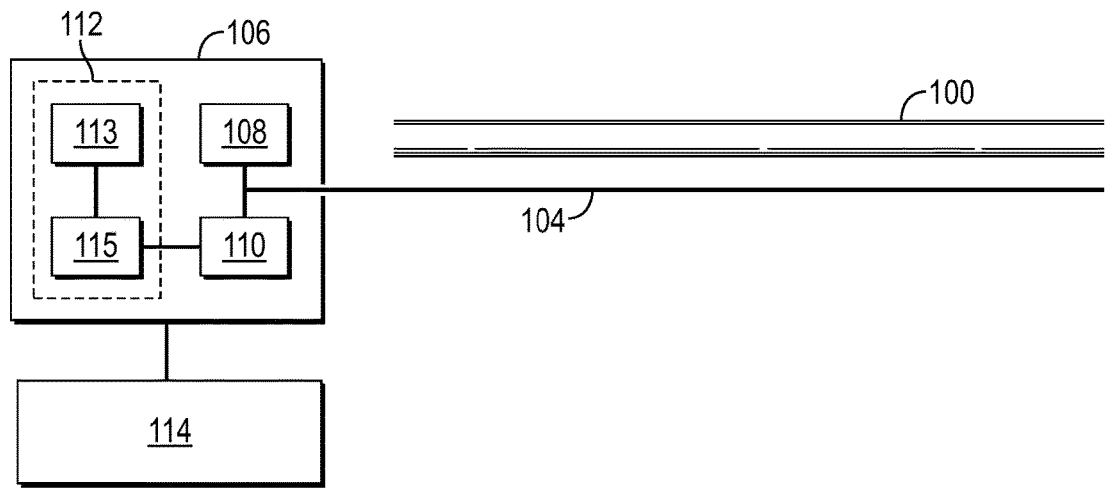
FIG. 5 is an example schematic representation of the sensing element connected to a DTS system and alarm processing system, according to an embodiment.

Turning now to FIG. 5, a DTS system 106 is shown coupled to the sensing element 104 so that the system 106 can be operated to obtain measurements of the temperature along the sensing element 104 at approximately regular intervals, such as distance increments of about 1 meter. Other distance increments can be used, but generally the increment should be smaller than the distance spanned by a temperature signature indicative of a leak. In an embodiment, the DTS system 106 can be configured as an optical system that includes an optical source 108 (e.g., a laser) to launch light into the sensing element 104, which is a fiber optic sensing element. In such an embodiment, the system 106 also includes a detector 110 to detect backscattered light generated by the optical fiber in response to the launched light, and an acquisition/processing system 112 to acquire information from the detected backscatter that is indicative of the monitored parameter (i.e., temperature) at locations distributed along the length of the optical fiber. The DTS system 106 also can include one or more processing devices 113 (e.g., microcontroller, microprocessor, etc.) and one or more memory devices 115 to store instructions of software for operating the instrument 106 and/or for processing information received from the optical fiber 104. Information received from the optical fiber 104 can also be stored in one or more memory devices for later retrieval and/or processing by a separate processing system.

A variety of distributed temperature sensing techniques are known in the art and those techniques can be employed with the DTS system 106 of FIG. 5. As an example, the DTS 106 can operate using either Raman scattering or Brillouin scattering within the optical fiber in the sensing element 104. In other embodiments, the sensing element 104 can be an array of closely-spaced temperature sensors, such as fiber Bragg gratings (FBGs) disposed along an optical fiber. In such embodiments, the optical source 108, the detector 110 and the acquisition/processing system 112 of the DTS system 106 can be configured to interrogate and measure the temperature-dependent wavelength of each FBG, the whole operating to determine a temperature profile where the distance sample points correspond to the FBG locations.

In the example embodiment shown in FIG. 5, temperature profiles (i.e., measurements of temperature versus distance along the sensing element 104) are made at regular time intervals by the DTS system 106. These profiles are formed of the combination of random fixed-pattern background 300, random measurement noise, and possibly also of the temperature signature of a leak of unknown characteristics at an unknown location. The successive profiles measured by the DTS system 106 can then be provided to an alarm processing system 114 which analyzes them to detect the presence and location of any temperature signatures, and raises leak alarms at the location of any found. The alarm processing system 114 can be local to or remote from the DTS system 106.

Figure 6:
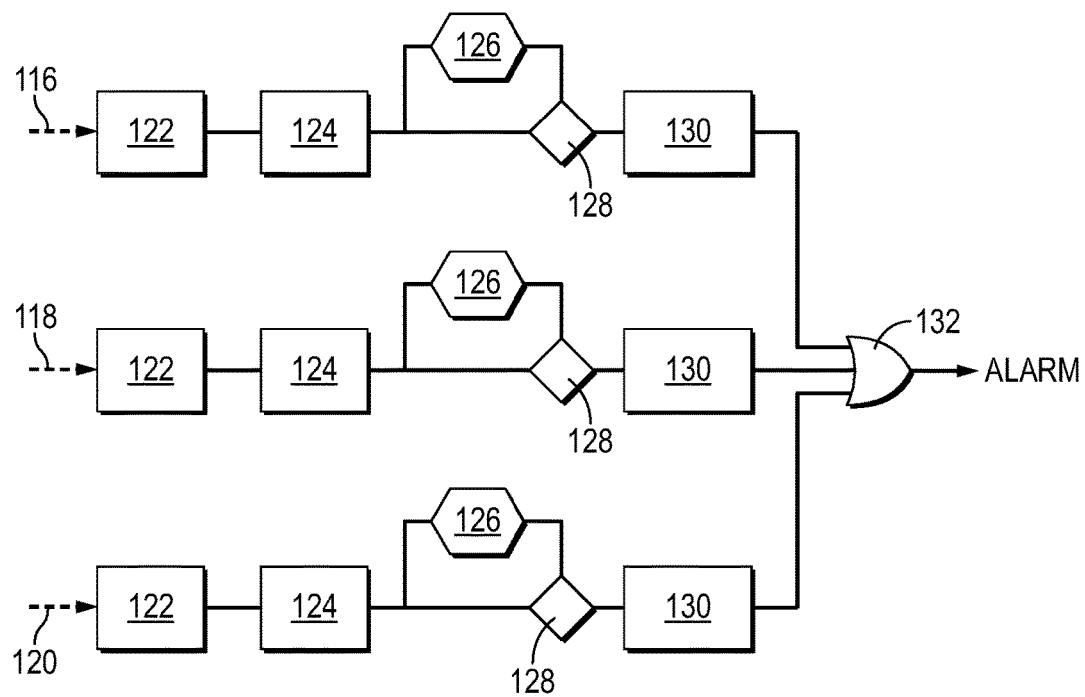
FIG. 6 is a schematic representation of an implementation of the alarm processing system of FIG. 5, according to an embodiment.

An example embodiment of an alarm processing system 114 is illustrated schematically in FIG. 6. The alarm processing system 114 includes one or more processing channels to process the temperature profiles and generate a leak alarm as appropriate. By way of example, and with reference to FIG. 6, the alarm processing system 114 using three channels 116, 118, 120 will be described, but it should be understood that fewer channels (including one channel) or more channels can be used. Each channel's processing operates similarly, but with some or all of the parameters of the processing being different for each channel. The alarm processing system 114 operates on a sequence of temperature profiles measured by the DTS system 106. Each profile is a measurement of the temperature variation with distance along the sensing element 104. The DTS 106 measures temperature profiles at approximately regular time intervals.

In each channel 116, 118, 120, each temperature profile in the sequence is applied to the input of a respective channel filter 122. The channel filters 122 operate in the distance domain, i.e., the input is filtered as a function of distance. The response of each channel filter 122 is largely a bandpass filter in the distance domain, with the limits of the pass band chosen to pass the spatial frequencies corresponding to a subset of the modeled temperature signatures 400-406 while eliminating, as far as possible, the spatial frequencies corresponding to the random fixed-pattern background 300. In embodiments, the responses of the channel filters 122 can be modified from a simple band-pass response to improve acceptance of the one set of spatial frequencies that corresponds to the temperature signatures 400-406 and the rejection of the other set that corresponds to the background 300. In general, the number of channels employed in the alarm processing system 114 and the responses of the individual channel filters 122 are determined by the range of different temperature signatures 400-406 expected from the different leaks simulated, their spectral characteristics, and those of the random fixed-pattern background 300 of the pipeline installation to be monitored.

By way of example, the three channels 116, 118, 120 can employ channel filters 122 with respective pass-bands approximating to the ranges 40 to 80 cycles/km, 45 to 110 cycles/km, and 80 to 135 cycles/km. The channel filters 122 can be implemented using any of the techniques commonly used. However, since each temperature profile is of restricted length, and all profiles are the same length, each of channel filters 122 can conveniently be implemented as a digital filter using the Fourier domain technique. The output signal from each of the channel filters 122 is also a temperature profile—i.e., filtered temperature versus distance.

In each channel 116, 118, 120, the output signal (i.e., the filtered temperature profile) from the channel filter 122 is then subjected to further processing. In the example illustrated in FIG. 6, this processing includes an energy calculation component 124, an energy threshold calculation component 126, a threshold detection component 128, and a track filter 130.

Starting with the energy calculation component 124, the squared value of the channel filter output at each distance sample point is the analogue of filtered signal energy. The energy calculation component 124 thus forms, for each distance sample point of the profile, the sum of a range of the squared filter outputs each side of the sample point. By way of example, the summed range may extend from −5 to +5 sample points, however the range can include more or fewer sample points. The output of the energy calculation component 124 is an energy profile, which is a measurement of summed filter output energy with distance.

The energy profile in each channel 116, 118, 120 is applied to the energy threshold calculation component 126 and the threshold detector 128. The energy threshold calculation component 126 calculates a threshold energy for each distance sample point of the energy profile. The threshold detector 128 examines the energy profile relative to the calculated energy threshold and provides a leak condition output signal indicative of whether the energy profile at a sample point exceeds the calculated threshold energy at that point.

Figure 7:
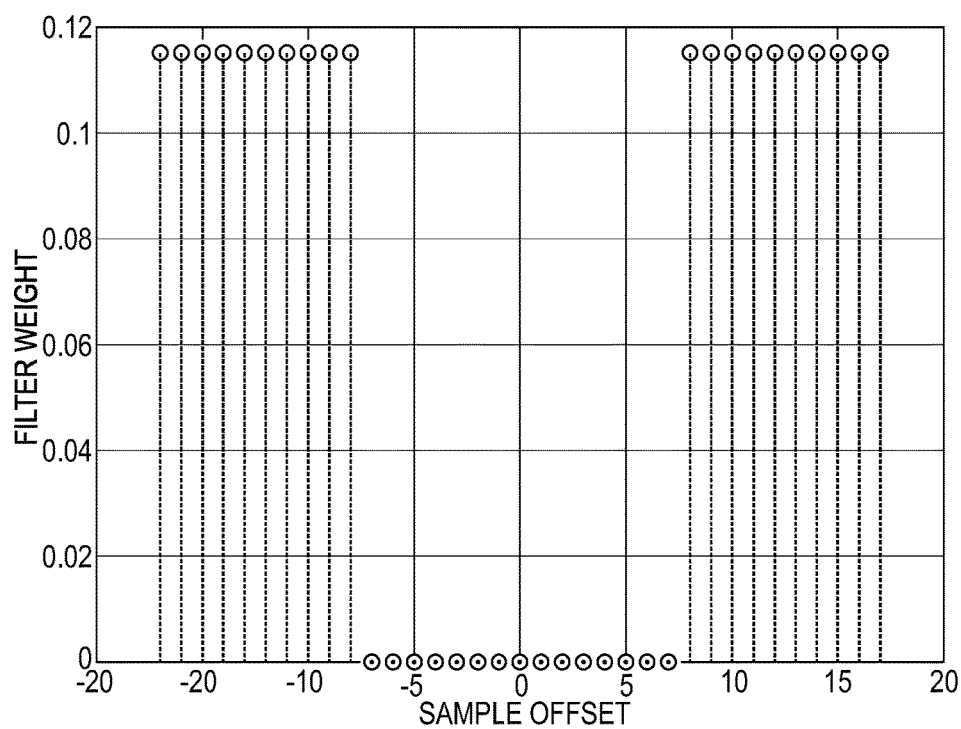
FIG. 7 is a plot of example filter weights that can be used an implementation of the threshold detector of the alarm processing system of FIG. 6, according to an embodiment.

By way of example, component 126 calculates the threshold energy at a sample point as the weighted sum of the energy profile samples each side of that point, with the samples closest to the point having low or zero weight. A representative set of sample weights is shown diagrammatically in FIG. 7, where the vertical axis represents the filter weight and the horizontal axis represents the sample point offset on either side of the sample point of interest (designated as "0" on the horizontal axis).

The design of the channel filters 122 is such that, for at least one channel 116, 118, or 120, the channel filter output will give a relatively high energy at sample locations near the location of a leak, compared with the energy at more distant sample locations. The threshold energy calculation component 126 operates to calculate the average energy each side of the central range of sample locations. If the central range contains a leak, the energy profile within the range will exceed the threshold, and threshold detector 128 will generate an output indicative of a potential leak condition. The threshold energy calculation component 126 and threshold detector 128 together comprise an implementation of a cell-averaging constant false alarm rate (CFAR) detector. It will be understood by one skilled in the art that alternative implementations of a CFAR detector exist, and can also be used with the embodiments disclosed herein.

In each channel 116, 118, 120, the output from the threshold detector 128 (e.g., an indication of leak or no leak at each distance sample point) is applied to the track filter 130. Because of the presence of measurement noise, and the random nature of the fixed-pattern background 300, the output from the threshold detector 128 can contain both false alarms (Type I errors) and missed alarms (Type II errors). The track filter 130 can be used to both reduce the incidence of false alarms and to reduce the incidence of missed alarms. As an example, the track model appropriate to leak detection is that a leak, once it forms, will remain in the same position on the pipeline (although an additional leak may later occur at an adjacent location). Hence the track filter 130 can be configured to examine only the successive threshold detector outputs (from successive measured temperature profiles) at a single distance sample point: independent track filters are applied to each distance point in the profile. One example implementation of the track filter 130 is the so-called 'M-out-of-N filter', in which a leak condition track is initiated when at least M out of the most recent N threshold detector outputs at a sample point indicate a leak. Once initiated, the presence of a track indicates a high probability of the presence of a leak.

In one example implementation, the values of M and N are 7 and 16 respectively. In this implementation, the role of track maintenance is also filled by the same M-out-of-N filter 130: if at some time fewer than M out of the most recent N threshold detector outputs at a sample point indicate a leak, the track is deleted. This very simple model is appropriate for the generation of alarms in a pipeline monitoring system, and is convenient and easy to implement. Other implementations can use differing values of M and N for track initiation and maintenance, or other techniques which take into account the amount by which the energy profile exceeded the energy threshold can be used. Again, one track filter 130 is implemented for each distance sample point.

The outputs from track filters 130 in each channel 116, 118, 120, at corresponding distance sample points, are logically combined by an OR gate 132. Since the channel filters 122 in each channel 116, 118, 120 are adapted to respond to the thermal signatures of different classes of leak, when a leak occurs, one or more of the track filters 130 may generate a track output while others do not. The OR gate 132 thus makes the leak detection available regardless of which channel 116, 118, or 120 detected the leak. Under some leak conditions, intermittent or partial track outputs can be generated by multiple channels 116, 118, 120. In this case, the OR gate 132 operates to provide a more consistent and reliable indication of the presence and location of the leak.

Because there is one track filter 130 for each distance sample point, if a leak occurs at some location on the pipeline, more than one adjacent distance sample point may generate a leak indication at the output of OR gate 132. In practice this is found to occur over only a short range of distances each side of the actual leak location and does not impair the utility of the detection technique.

For the same reason, if more than one leak occurs, at locations which are more widely separated along the length of the pipeline, a separate leak indication will be generated at each leak location (and possibly also at points adjacent to each).

The embodiments as described above can be extended to monitor multiple pipelines in different locations, using independent sensing elements for each. Alternatively, a single sensing element can be disposed so that it is adjacent to different pipelines in different parts of its length. In such an embodiment, multiple alarm processing systems 114 can be used corresponding to the different pipelines, with operating parameters, such as the number of channels, the passbands of the filters 122 in each channel, and the parameters of the track filters 130, chosen to optimize the response of the alarm processing system 114 to the different thermal signatures expected from leaks in each different pipeline. Each alarm processing system 114 operates only on the portion of the DTS temperature profile corresponding to the appropriate pipeline.

Another implementation of the present invention uses a sensing element 104 which is disposed to monitor a pipeline, where the operating conditions of the pipeline, such as its diameter and burial depth, and the pressure and temperature conditions of the fluid within it vary along its length. In this implementation, the temperature profile is divided into segments, where the operating conditions within each segment are similar, each with its own alarm processing system 114, and the operating parameters, such as the number of channels, the passbands of the filters 122 in each channel, and the parameters of the track filters 130, chosen to optimize the response of the alarm processing system 114 to the different thermal signatures expected from leaks in each different segment. Each alarm processing system 114 operates only on the portion of the DTS temperature profile corresponding to the appropriate segment.

In another implementation, multiple sensing elements 104 can be disposed adjacent to a buried pipeline 102, in different locations with respect to the pipeline 102, and the DTS system 106 operated to measure temperature profiles from each, and the temperature profiles from each sensing element 104 applied to multiple alarm processing systems 114. In this implementation, the alarm processing systems 114 can use different operating parameters, such as the number of channels, the passbands of the channel filters 122 in each channel, and the parameters of the track filters 130, where the parameters are chosen to optimize the response of the alarm processing system 114 to the thermal signatures expected at each sensing element location. In this implementation, the leak detection outputs from OR gate 132 at corresponding locations of each alarm processing system 114 can be combined, so that indications of a leak at the same location on the pipeline can be generated from any of the sensing elements 104.

The leak detection output from OR gate 132 can be used to activate a warning indication to a human operator, or it can be used to signal the presence and location of a leak to a supervisory control and data acquisition (SCADA) which can take automatic action such as shutting down the pipeline flow, or both simultaneously. Such an automated system can also make use of outputs from additional sensors, such as pressure, flow velocity, or vibration sensors, to further increase the probability of rejecting false alarms and reduce the probability of missing true alarms.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method of detecting leaks from a pipeline, comprising:
    operating a distributed temperature sensing (DTS) system to obtain temperature profiles from a sensing element deployed along a length of a pipeline that is carrying a fluid, wherein the temperature profiles are measures of temperature at sample distance points along the sensing element;
    spatially filtering the temperature profiles to generate filtered temperature profiles that are limited to a set of spatial frequencies that corresponds to an expected temperature signature indicative of a fluid leak;
    determining, for each of the filtered temperature profiles, an energy profile;
    determining, for each of a plurality of the sample distance points, whether the energy profile exceeds an energy threshold; and
    generating leak condition signals for sample distance points based on the corresponding energy threshold determination,
    wherein the leak condition signals comprise leak condition tracks that are generated by applying a track filter to successive energy threshold determinations for a particular sample distance point.

2. The method as recited in claim 1, wherein the sensing element is a distributed fiber optic sensor.

3. The method as recited in claim 1, wherein the sensing element comprises an array of Fiber Bragg Gratings disposed along the length of an optical fiber.

4. The method as recited in claim 1, wherein determining the energy profile comprises determining, for each of the plurality of the sample distance points, a sum of signal energies within a range on each side of the particular sample distance point.

5. The method as recited in claim 4, wherein determining whether the energy profile exceeds the threshold energy comprises calculating the threshold energy for corresponding sample distance points, wherein the threshold energy for a sample distance point is a weighted sum of the energy within a range of sample distance points in which that particular sample distance point is centered.

6. The method as recited in claim 1, wherein the track filter is a M-out-of-N filter, and wherein the track filter initiates a leak condition track if at least M out of N most recent energy threshold determinations is indicative of a fluid leak, wherein M is less than or equal to N.

7. The method as recited in claim 1, further comprising:
    spatially filtering the temperature profiles to generate second filtered temperature profiles that are limited to a second set of spatial frequencies that corresponds to a second expected temperature signature indicative of a fluid leak;
    determining, for each of the second filtered temperature profiles, a second energy profile;
    determining, for each of a plurality of the sample distance points, whether the second energy profile exceeds an energy threshold; and
    generating second leak condition signals for sample distance points based on the corresponding energy threshold determination.

8. The method as recited in claim 7, further comprising generating an alarm signal if any one of the leak condition signals and second leak condition signals is indicative of a fluid leak.

9. The method as recited in claim 1, wherein the sensing element extends along the length of a plurality of pipelines and the DTS system is operated to obtain temperature profiles along each of the pipelines.

10. The method as recited in claim 1, wherein a second sensing element extends along the length of the pipeline, and the method further comprises:
    operating the DTS system to obtain second temperature profiles from the second sensing element;
    spatially filtering the second temperature profiles to generate second filtered temperature profiles that are limited to a set of spatial frequencies that corresponds to an expected temperature signature indicative of a fluid leak;
    determining, for each of the second filtered temperature profiles, a second energy profile;
    determining, for each of a plurality of the sample distance points, whether the second energy profile exceeds an energy threshold; and
    generating second leak condition signals for sample distance points based on the corresponding energy threshold determination.

11. A method, comprising:
    operating a distributed temperature sensing (DTS) system to obtain a time sequence of temperature profiles from a fiber optic sensing element deployed proximate a pipeline that transports a fluid;
    spatially filtering the time sequence of temperature profiles to generate filtered temperature profiles that are limited to a set of spatial frequencies that corresponds to expected temperature signatures at distance points along the sensing element that are indicative of one or more leak conditions;
    determining, for each of a plurality of the distance points, whether an energy component of the filtered temperature profiles exceeds a threshold energy for that distance point; and
    based on the determination, generating an alarm signal identifying a fluid leak at one or more of the distance points,
    wherein generating the alarm signal comprises initiating, for each of the plurality of distance points, a leak condition track based on determining that the energy component exceeds the threshold energy for that distance point.

12. The method as recited in claim 11, further comprising determining the threshold energy for each of the plurality of the distance points based on a weighted sum of the energy within a range of distance points in which that particular distance point is located.

13. The method as recited in claim 11, wherein the leak condition track is initiated based on determining that the energy component exceeds the threshold energy for that distance point in at least M out of N successive filtered temperature profiles in the time sequence, wherein M is less than or greater than N.

14. A method of detecting leaks from a conduit, comprising:
  operating a distributed temperature sensing (DTS) system to obtain temperature profiles from a sensing element deployed along a length of a conduit that is carrying a fluid, wherein the temperature profiles are measures of temperature at sample distance points along the sensing element;
  determining, for each of the temperature profiles, whether an energy component of the temperature profile exceeds an energy threshold; and
  generating leak condition signals for sample distance points based on the corresponding energy threshold determination,
  wherein the leak condition signals comprise leak condition tracks that are generated by applying a track filter to successive energy threshold determinations for a particular sample distance point.

15. The method as recited in claim 14, wherein the sensing element is a distributed fiber optic sensor.

16. The method as recited in claim 14, wherein the sensing element comprises an array of Fiber Bragg Gratings disposed along the length of an optical fiber.

17. The method as recited in claim 14, wherein the track filter is a M-out-of-N filter, and wherein the track filter initiates a leak condition track if at least M out of N most recent energy threshold determinations is indicative of a fluid leak, wherein M is less than or equal to N.

18. The method as recited in claim 14, further comprising generating an alarm signal if any one of the leak condition signals is indicative of a fluid leak.

19. The method as recited in claim 14, wherein the conduit is a pipeline, and wherein the fluid is a hydrocarbon fluid.

* * * * *